July 15, 1924.
W. P. HOOPES
CUSHION WHEEL
Filed Dec. 1, 1922
1,501,778
2 Sheets-Sheet 2
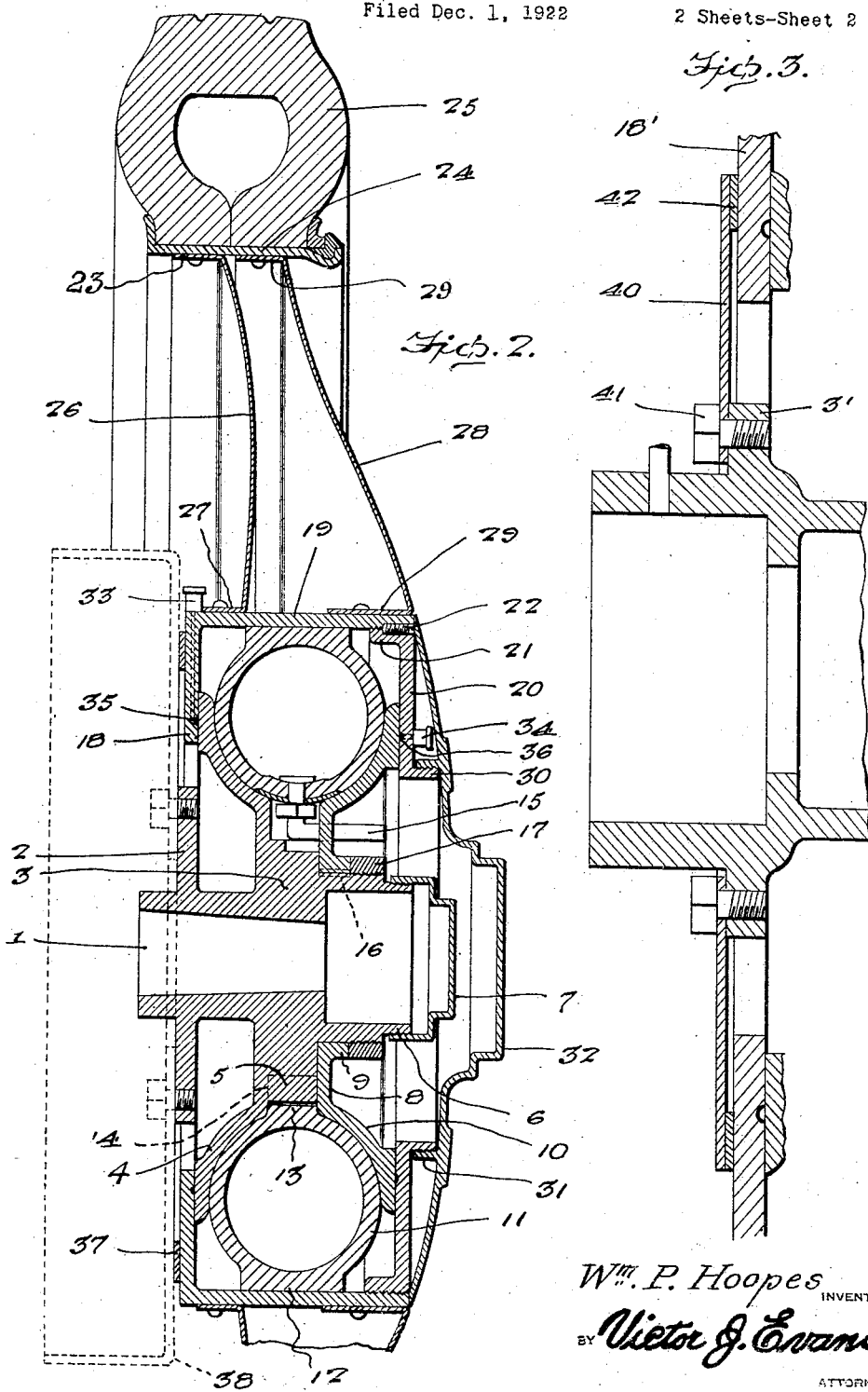
Wᵐ. P. Hoopes
INVENTOR
BY Victor J. Evans
ATTORNEY Patented July 15, 1924.

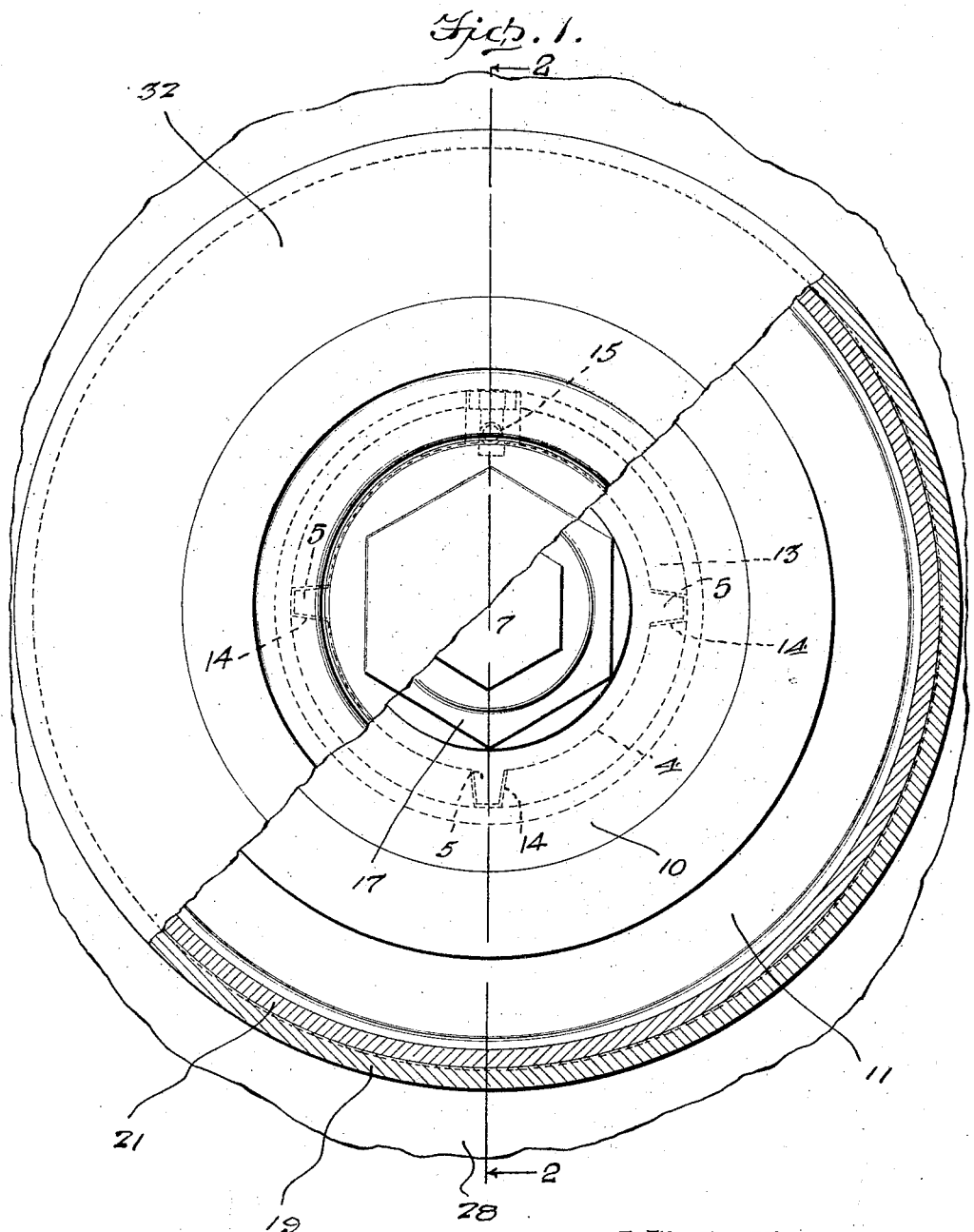

1,501,778

UNITED STATES PATENT OFFICE.

WILLIAM P. HOOPES, OF BUFFALO, NEW YORK.

CUSHION WHEEL.

Application filed December 1, 1922. Serial No. 604,272.

*To all whom it may concern:*

Be it known that I, WILLIAM P. HOOPES, a citizen of the United States, residing at Buffalo, in the county of Erie and State of New York, have invented new and useful Improvements in Cushion Wheels, of which the following is a specification.

My present invention has reference to elastic wheels for motor vehicles, and has for its primary object to simplify and improve the construction of devices similar to the device upon which I have been granted U. S. Letters Patent No. 1,005,707, dated October 10, 1911.

Other objects and advantages will present themselves as the nature of the invention is more fully described when taken in connection with the drawings that accompany and form part of this application.

In the drawings there has been illustrated a simple and satisfactory form of the improvement, it being understood, however, that no limitation is necessarily made to the precise structural details therein exhibited, but that changes, alterations and modifications within the scope of what is claimed may be resorted to when desired.

In the drawings:—

Figure 1 is a front elevation of the hub of the wheel embodying the invention, parts being broken away in order to expose underlying parts, and parts being also in section.

Figure 2 is a sectional view approximately on the line 2—2 of Figure 1, the said section extending through the tread of the wheel.

Figure 3 is a fragmentary enlarged central sectional view through the hub of the front axle to illustrate the dust guard thereon.

Like numerals designate corresponding parts throughout the several views.

The improved wheel comprises a hub having a bearing sleeve 1 formed adjacent to its inner end with an outstanding flange 2 and being approximately centrally formed with an outstanding cross sectionally rounded lug 3. The lug 3 has an arcuate extension 4 providing one of the elements for the seat of a tire, hereinafter to be described. The extension 4 is directed toward the flanged end 2 of the bearing sleeve 1, and the outer face of the lug, at determined spaced intervals, carries fingers 5. Formed on the outer face of the lug 3, outward of the bore of the bearing sleeve 1 there is an annular extension 6 provided with exterior threads, and whose end is reduced and threaded for the reception of the hub oil cap 7.

Arranged on the annular extension 6 there is a ring member 8 having its inner end provided with a flange 9 that terminates in an arcuate extension 10, oppositely directed with respect to the extension 4. The extension 10 of the ring member 8 provides the second element of the seat for the tire which will presently be described, it being understood, of course, that the removable tire seat section is not positioned to engage the tire until after the said tire has been arranged upon the fixed portion of the said seat.

The tire, which provides the cushioning element of the device, is indicated by the numeral 11, the same having its outer surface formed with a flat tread portion 12 and its inner portion centrally formed with a continuous web 13. The web 13 has peripheral notches 14 which receive therein the fingers 5. The web 13 has one more notch than the number of fingers on the lug and this notch receives therethrough the angle valved air filling tube 15, the said tube also passing through a suitable opening in the straight side of the removable and adjustable tire seat section.

The removable tire seat section is keyed to the extension 6 of the lug of the bearing sleeve, as indicated by the numeral 16, and has its straight surface forced against the shoulder provided between the lug 3 and the extension 6 through the medium of a nut 17 that is screwed on said extension. The outer faces of both the fixed and removable tire seat sections are straight, the straight face of the fixed section being in contacting engagement with a flange 18 formed on one edge of a spoke ring 19, while that of the removable tire seat section is in contact with an annular plate 20, The annular plate has its outer edge flanged in one direction, as indicated by the numeral 21 and its inner peripheral edge flanged in an opposite direction as indicated by the numeral 30. The spoke ring 19 has interior threads which are engaged by exterior threads on the flange 21. To positively hold the annular plate from turning when properly positioned I provide both the flange 21 and ring 19 with semi-circular threaded depressions which, when brought to alignment receive therein a headless bolt 22.

I have referred to the ring 19 as a spoke ring, but in the present instance, I do not employ spokes in my wheel construction. In lieu thereof a disk is positioned between the spoke ring 19 and the tire carrying rim of the wheel. This disk is of a particular and peculiar construction. The disk is formed from a single piece of suitable, light, strong metal, such for instance as steel, the same being centrally bent upon itself to provide a flat annular portion 23 which is riveted or otherwise secured to the rim 24 that carries the tread or tire 25. The tread or tire 25 is of the solid construction, the same, however, being centrally provided with a bore therethrough, and the tire is secured on the rim 24 in the usual manner. From its portion 23, the disk has its inner face bowed inwardly, as at 26, its inner periphery flanged outwardly to provide a ring portion 27 that surrounds the ring 19 and is secured thereto. A second and outer disk 28 is also employed. The disk 28 has its body curved or rounded outwardly and its periphery provided with flanges 29 which are secured respectively to the spoke ring 19 and to the tire carrying rim 24.

Screwed on the threaded flange 30 of the annular plate 20 there is a dust cap 32.

The flange 18 and the annular plate 20 have their inner faces provided with continuous grooves 35 and 36 respectively into which a lubricant is designed to be fed through the medium of lubricant boxes 33 and 34.

Secured to the flange 18 of the ring 19 there is a fiber disk 37 that prevents the entrance of dust, dirt, etc., between the flange 2 of the bearing sleeve 1 and the flange 18 of the ring 19. In the device illustrated in Figure 2, the brake drum 38, for the drive wheel of an automobile, is indicated by the dotted lines, while in the construction illustrated in Figure 3 a portion of a hub for the front wheel of a vehicle is shown. Both constructions are substantially similar, but in the showing of Figure 3 the space between the bearing sleeve flange 3' and the side 18' of the spoke ring is covered by a fiber disk 40 which is bolted, as at 41 to the flange 3'. This disk has upon its inner face at its outer periphery a compressible disk or ring 42 which, through the medium of the disk 40 and the securing means 41 is held in tight frictional engagement with the outer face of the flange or side 18'.

It is believed that the foregoing description, when taken in connection with the drawings will fully set forth the construction, advantages and operation of the improvement to those skilled in the art to which this invention relates, it being understood, that weight imposed on the wheel will compress that portion of the tire 11, which lies below the bearing sleeve and that the interengaging means between the lug 3 and the tire 11 prevents displacement of the tire about the axis of the wheel. It will be further noted that I have dispensed with a great number of parts employed in my aforementioned patented construction No. 1,005,707, so that the construction herein described is greatly simplified, the parts constituting the same more easily and more cheaply manufactured, as well as being replaceable should injury occur to any of such parts. The tire 11 may be readily inflated by removing the cap 32.

Having described the invention, I claim:—

1. In an elastic wheel, a hub including a bearing sleeve having an outstanding flange, an outstanding lug on the sleeve formed with a concaved side extension to provide the fixed section of a tire seat, a member surrounding the hub, in contacting engagement with the lug thereof and having an arcuate side providing the second section of the tire seat, means adjusting the removable seat section with respect to the fixed seat section, means for locking the removable seat section on the sleeve, a pneumatic tire for the seat, interengaging means between the tire and the lug for holding the former from turning on the latter, a cap for the sleeve, a ring surrounding and contacting the outer surface of the tire, said ring having an integral flange in contact with one of the sides of the tire seat, a removable disk adjustably secured to the opposite end of the ring, means locking said disk to said ring, a tire carrying rim surrounding the hub, a disk comprising inner and outer sections fixed to the tire carrying rim and to the ring, a cap threadedly engaging the removable disk and in contacting engagement with the ring, and means for feeding a lubricant between the sides of the ring and of the removable disk and the sides of the tire seat.

2. In an elastic wheel, a bearing sleeve having a flange and a lug outward of the flange, said lug having an arcuate extension whose outer face is flat and which, in combination with the lug provides a tire seat section, said lug having peripheral fingers, said sleeve having a tubular extension surrounding the bore thereof which is exteriorly threaded and which is formed with a reduced portion that is also threaded, a member on the extension having a flange in contact with the lug and further having an arcuate extension whose outer face is straight and which provides the second member of the tire seat, a nut screwed on the extension in contact with said member, means for holding the removable seat section from turning on the sleeve, a cap threaded on the outer end of the sleeve extension, a tire for the seat having a straight tread surface and an inner web provided with notches, certain of which receiving the sleeve fingers, and the remaining notch providing a pocket for the valved air tube of the tire, a spoke ring surrounding and in contacting engagement with the tread of the tire, said spoke ring having a fixed flange in contacting engagement with one of the sides of the tire seat, a spoke dust guard closing the space between said flange and the flange of the sleeve, an annular plate peripherally engaging the ring, and in contacting engagement with the second side of the tire seat, means locking the annular plate to the spoke ring, means for feeding a lubricant between the annular plate and side of the tire seat contacted thereby, means for feeding a lubricant between the fixed side of the ring and the side of the tire seat contacted thereby, a tire carrying rim surrounding the hub, a disk including inner and outer sections fixed to the tire carrying rim and to the spoke ring, and a cap member threadedly engaging the annular plate and in contacting engagement with the outer face of the spoke ring.

In testimony whereof I affix my signature.

WILLIAM P. HOOPES.